July 16, 1946.    J. J. MOYNIHAN    2,404,243
COORDINATING APPARATUS
Filed Feb. 7, 1942    2 Sheets-Sheet 2
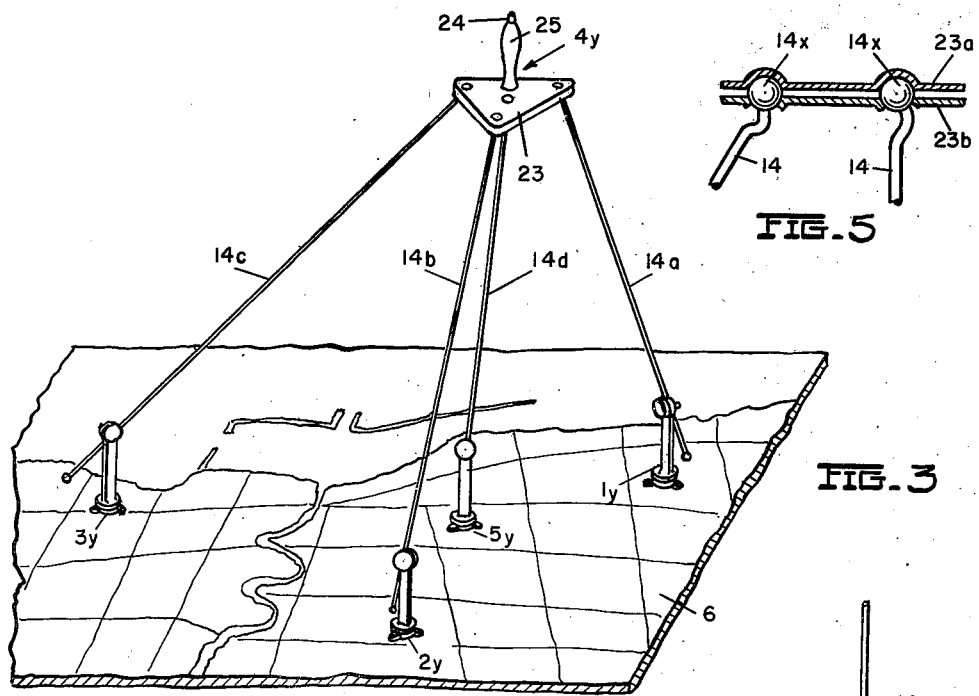
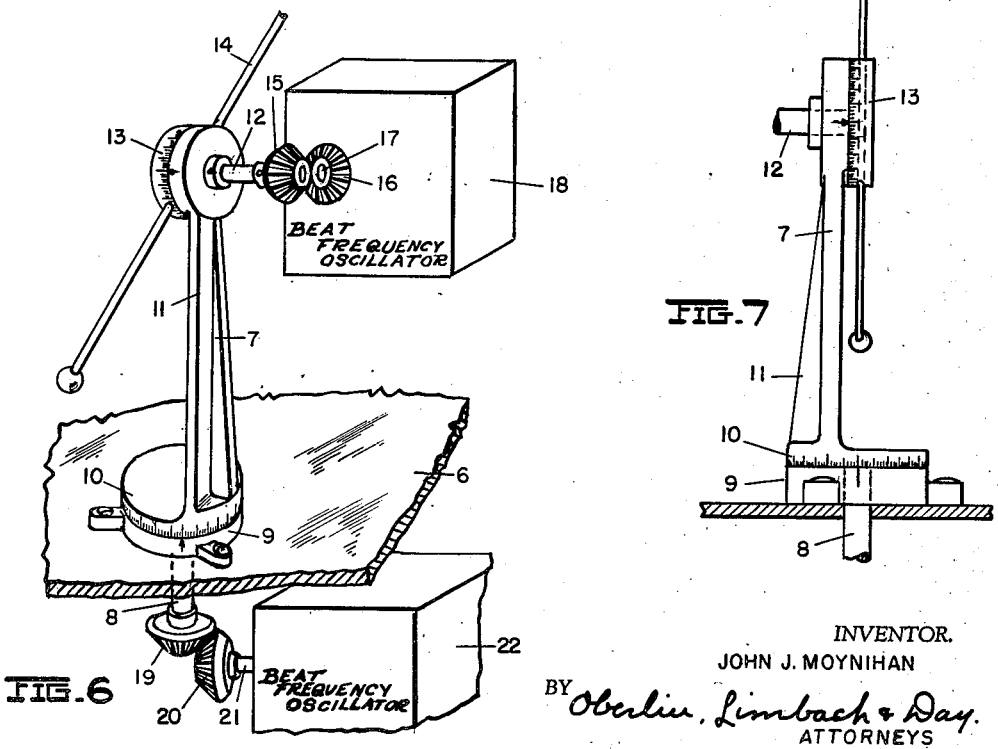
INVENTOR.
JOHN J. MOYNIHAN
BY Oberlin, Limbach & Day.
ATTORNEYS Patented July 16, 1946

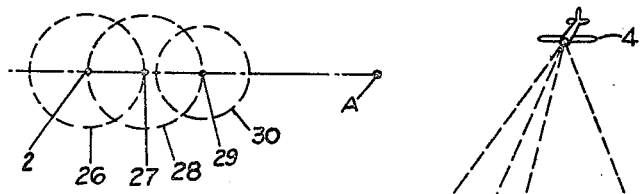
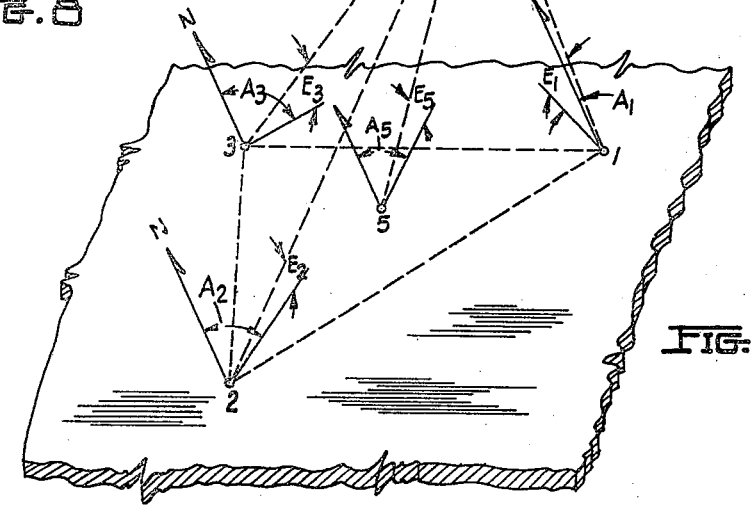
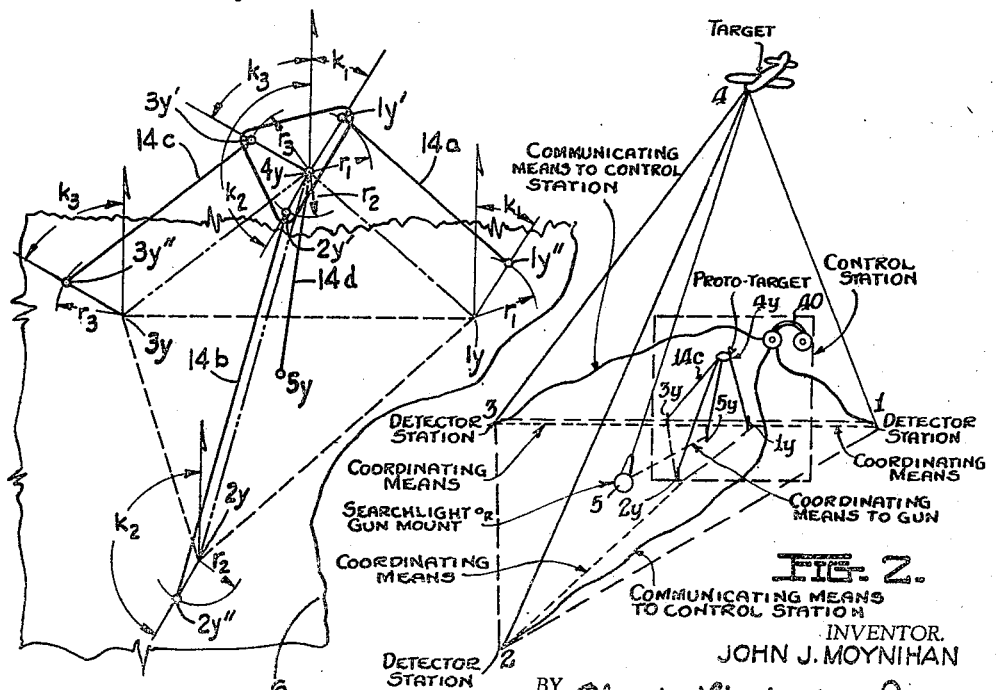

2,404,243

UNITED STATES PATENT OFFICE 2,404,243

COORDINATING APPARATUS

John J. Moynihan, Boston, Mass., assignor of one-half to Joseph B. Brennan, Cleveland, Ohio Application February 7, 1942, Serial No. 429,897

3 Claims. (Cl. 89—41)

This invention relates as indicated to coordinating apparatus and more especially to a method of and apparatus for coordinating from one point a plurality of separate devices so that they may bear a desired relationship to each other, or to another device or point.

One of the objects of this invention is to provide a means of the character described by which a plurality of devices may be coordinated so that they may be focused either in a particular relation to each other, or upon a common point.

It is a further and more specific object of my invention to provide a method of and apparatus for the location of an energy source and the focusing thereon, or in a particular relation with respect thereto, of devices spaced with respect to such energy source, and some of which may be functionally responsive to the energy emitted or reflected from such source.

My invention can best be understood perhaps by having reference to specific applications of the same, and among such I may mention that my invention provides a novel means and mode for the purpose of locating aircraft in flight, preferably by the utilization of spaced directional microphones by which my apparatus is capable of utilizing the sound energy emitted from aircraft engines in locating the same, and my invention includes means for the simultaneous and coordinate focusing upon such aircraft, means such as a search light, gun, or the like. It will be apparent from the ensuing description that my invention, in its specific embodiment, just explained, is equally applicable for the purpose of locating other sound emitting sources and of simultaneously focusing thereon the desired instrument.

The principles of my invention may also be utilized in connection with the coordinate focusing of devices such as search lights so that an object whose position is to be determined with relation to the apparatus can thus be fixed by the coordinate focusing thereon of one or more search lights, and the apparatus comprising my invention makes possible the simultaneous focusing thereon of other instruments such as guns, other search lights, photographic equipment, and the like.

From the foregoing, it will be observed that it is a principal object of my invention to provide a method of and apparatus for the coordinate focusing of a plurality of instruments on a common point, only certain of which instruments are functional to indicate the point or object whose state, position, or location is to be determined, whereas other of the focused means may be utilized for other purposes by being focused upon the point thus determined.

Perhaps a concrete illustration will serve to indicate the field of general applicability of my invention and indicate the mode of its improvement over the prior art. Let us take the illustration of locating enemy aircraft in flight and the training thereon of anti-aircraft cannon.

As at present practiced, anti-aircraft cannon is either trained by direct sighting, if the target is clearly visible, or more frequently when the target is not visible, by sound detecting devices which are capable of indicating instantaneous approximate positions of the sound emitting target. These detector devices, however, merely supply information which is utilized as basic data in the usual calculations made in connection with a determination of the pointing of the cannon with respect to azimuth and elevation.

It is, of course, obvious that the time element consumed in making any such calculations and adjusting the gun in accordance therewith requires that at the completion of the calculations it be assumed that the direction and rate of movement of the target has not changed in order that an assumption may be made as to its new position at the instant the gun settings are completed. Furthermore, the human element of making the calculations enters into the final result, and this, coupled with the many other pure assumptions and literally guesses which must be made, renders the sighting of anti-aircraft cannon extremely inaccurate as evidenced by the very low percentage of hits scored in actual practice.

By the utilization of my invention, the detecting devices, whether they be search lights, microphones, radio energy receiving and detecting devices, or the like, and the device sought to be controlled, such as the anti-aircraft cannon or search light, are at all times coordinately focused in particular relation to one another, a specific example being that they may be all focused at all times on a common point. By the utilization of my invention this common point or the predetermined relationship existing between the several focused and focusing devices, may be moved about until such common point or predetermined relationship coincides with, or bears a particular relationship to, the target under investigation, and the focused device, if it be a cannon, may be instantaneously discharged or otherwise energized, since there need be no time interval lapse during which the focused device must be brought into coordination with the focusing devices, except such time interval as obtains due to the finite speed of the detection energy.

It will be apparent from the foregoing description of the general objects of my invention and from the ensuing particular description of the same that its field of usefulness is extremely broad, and accordingly other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Broadly stated, my invention comprises the coordination of detection and projection devices in such a manner, and with such devices bearing a predetermined relationship to each other, that the beam of the detection device or devices always bears a predetermined relationship to the beam or trajectory of the projection devices.

It will be apparent from the following description that certain of the devices coordinated by means of my invention may be respectively defined as detection and projection devices, and where in this specification and in the appended claims these terms are used, they shall, for convenience have the following meaning:

A detection device is any means such as a directional microphone, search light, or the like, which may be set up and manipulated by remote control with respect to the target so that, either by visually observing or listening, the operator at a remote control station may determine when the linear trajectory of the device intersects the target. When a search light is used, this will be determined by an operator watching the target and determining when the search light of the detecting device falls on the target. When the detectional device is a directional microphone, this will be determined by the operator by listening and the intersection of the linear trajectory of the microphone with the target is determined by the maximum sound picked up by the microphone.

The projection devices are intended to include those devices whose linear trajectory is caused to follow, or the direction of which trajectory is controlled, by factors determined by the coordination of the linear trajectories of the detecting devices on the target. Obviously, the projection devices may be an antiaircraft cannon, a search light, a photographic apparatus, or the like.

Throughout the following description will be found used the terms "beam," "trajectory" and "linear trajectory." The term "beam" is used to define not only the line along which is projected the energy of a projection device such as a search light, but also includes, for example, the line defining the line of greatest sensitivity of a detection device such as a directional microphone. The term "beam" is thus used generically to denote not only the line defining the direction of the emitted energy, but also the line of direction of received energy. The term "trajectory" is used in its normal sense in defining the path of the projectile of a cannon, for example, and the term "linear trajectory" when used herein is intended to mean the theoretically straight line which the projectile would follow if not deviated from such course by influences such as gravity, windage, and the like. The term "linear trajectory" is therefore used to define the line along which either a detection or projection device is pointed, and in a gun corresponds to the line of departure as shown in Fig. 1 of War Department Coast Artillery Field Manual FM 4—10, Seacoast Artillery Gunnery.

It is believed that the invention may be best understood by having reference to the accompanying figures, in which:

Fig. 1 is a diagram showing an airplane in flight over an illustrated terrain on which are located a plurality of detection devices, and a projection device such as an anti-aircraft cannon;

Fig. 2 is a perspective view of the polyhedron formed by the beams and/or trajectories of the various projection and detection devices shown in Fig. 1 in association with the coordinating apparatus of the present invention;

Fig. 3 is a perspective view of a map on which are mounted stations corresponding, for example, to the location of the stations of Fig. 1, each such station provided with and correlated by the apparatus comprising my invention;

Fig. 4 is a diagrammatic representation of the manner in which the location of certain points on the proto-target shown in Fig. 3 may be determined;

Fig. 5 is a fragmentary sectional view of a portion of the proto-target shown in Fig. 3, indicating the manner of connection thereto of the rods which comprise the sides of the protopolyhedron;

Fig. 6 is a perspective view of a portion of Fig. 3 illustrating more specifically the manner by which the azimuth and elevation indicating devices associated with each of the sides of the proto-polyhedron may be connected to the adjustment dial of a beat frequency oscillator forming a part of the means whereby the proto-tetrahedron is at all times correlated with the actual polyhedron of Fig. 1;

Fig. 7 is a side elevational view of the azimuth and elevation indicating device shown in Fig. 6; and Fig. 8 is a diagrammatic representation of the pattern followed by the movement of the proto-target in the exploratory stages of the operation of the device in locating the target and then following the target in its movement.

Referring now more specifically to the drawings, and more especially to Fig. 1, it will be observed that in the usual sighting of aircraft cannon, or the similar directing of devices, such as search lights, radio energy transmitting and reflecting devices, photographic equipment or the like, a plurality of stations, here respectively identified by the numerals 1, 2 and 3, are established at appropriate places on the terrain where devices, such as search lights, directional microphones, radio energy transmitting and/or receiving devices are established. These stations 1 to 3 are established for the purpose of determining the location of a target such as the airplane 4, so that a cannon, search light, or the like, stationed at 5, for example, may be trained upon the target.

Now in conventional practice as previously indicated the use of variously placed directional microphones is not new. From these variously placed directional microphones, the prior art has been able to determine the azimuth and elevation of the target 4 with respect to each observation point. For convenience, the azimuth angle of the target 4 in Fig. 1 is identified as A1, A2 and A3 respectively at each of the stations. Similarly, the elevation at these three respective stations has been indicated by the angles E1, E2, and E3. According to present practice, this information, i. e., as to the azimuth and elevation of the target with respect to each reference point, is transmitted to a central station, from which basic data, the azimuth and elevation of the target 4 with respect to the cannon station 5, for example, may be calculated trigonometrically. By the time this information is assembled, the calculations made, and the line of sight of the cannon at 5 made to coincide with such calculations, the target 4 may have moved entirely out of the calculated field of fire.

Basically, my invention contemplates the construction of a prototype or small scale model of the geometrically related control and controlled points or associated stations, and involving a polyhedron with base and apex. For conciseness, the term "prototype" may be abbreviated to "proto" as a prefix where referring to the parts of such scale model. Thus, if we construct a proto-polyhedron as per Fig. 3, and then provide means for coordinating the length, elevation and azimuth of each of the variable lines of such proto-polyhedron with the elevation and azimuth of the detection and projection devices located at positions 1, 2, 3, and 5 of Fig. 1, then it will be apparent that the beam or trajectory of the device at station 5, for example, may be maintained at all times as passing through the point of intersection of the three lines representing the beams of the devices at the remaining stations 1, 2 and 3. And such control model or coordinator with its proto-target plate 23 at its base points is homologous in detail with the corresponding points of the actual space polyhedron with which it is connected, as indicated in Fig. 2.

More specifically, if the devices at points 1, 2 and 3 of Fig. 1 are search lights casting a red beam, for example, and the device at point 5 Fig. 1 is a search light casting a white beam for example, the proto-polyhedron of Fig. 2, or more specifically the proto-target 4y therein, may be moved about in space causing the point of intersection of the three red beams to similarly move about in space. The white search light beam from the device at station 5 will at all times be trained on this common point, moving about in space, and when such point coincides with the target, then all of the devices will be in common focus thereon. This brings us to a consideration of the construction of physical means for the accomplishment of the same results.

Referring now to Fig. 3, the base thereon indicated at 6 has inscribed thereon the outlines of a map of the terrain on which the stations 1, 2, 3 and 5 of Fig. 1 are located. These stations will be given the corresponding reference characters with the subscript $y$, and the proto-target will be indicated by the reference character 4 with a subscript $y$.

The map on the base 6 will have accurately plotted thereon the location of each of the four stations established on the actual terrain. The particular scale to which such map is drawn is not critical. A standard 7, the construction of which is most clearly illustrated in Figs. 6 and 7, is positioned at each of the four stations on the map 6. These standards 7 comprise a locating pin 8 arranged to pass through a hole drilled in the plate 6 preferably at the precise location to scale of each of the four stations on the map. The base 9 is cylindrical and calibrated or provided with a reference mark thereon to cooperate with calibrations 10 formed on the part 11 which is rotatable with respect to the part 9. It will be observed that these calibrations and reference points 10 and 9 respectively indicate the azimuth of the part 11.

The part 11 at its upper end is provided with a bearing in which is journaled a shaft 12 carrying a drum 13 in which is slidably mounted the rod 14. A reference mark on the cylindrical head of the part 11 cooperating with a scale on the drum 13 will indicate the elevation of the rod 14, the azimuth of such rod being indicated by the scale and reference mark 10 and 9 respectively.

Fixed to the opposite end of the shaft 12 is a beveled gear 15 which meshes with a beveled gear fixed to the shaft 17 by which the output of a beat frequency oscillator 18 may be adjusted. Similarly the shaft 8, which is connected with the part 11 has a beveled gear 19 connected to its lower end, and such beveled gear meshes with a beveled gear 20 fixed on the shaft 21, by which the output frequency of a beat frequency oscillator 22 may be adjusted.

From the description of Fig. 6 it will be observed that proportional variations in the elevation of the rod 14 will result in variations in the output frequency of the beat frequency oscillator 18 and similarly variations in the azimuth of the rod 14 and its support or standard 7 will result in proportional variations in the output frequency of the beat frequency oscillator 22. The rods 14 extending from each of the stations 1 to 5 on Fig. 4 are respectively marked 14a, 14b, 14c, and 14d.

Theoretically, the four rods 14a–14d should be connected to a universal joint having a common center. Such a construction is, however, rather difficult to provide, and a full substitute therefor may be provided in the form of a plate 23 to which the four rods 14a–14d are connected in the manner now to be described.

Fig. 4 is a plan view of the map of Fig. 3 on which the proto-target is shown in one of its extreme positions outside the limits of the detecting network on the ground. Here 4y is the center of the proto-target. That is, it represents the location of the aircraft to the scale of the map. For simplicity, the point 4y is tied in with the point 5y and gun location, directly. Having thus used the point 4y for one universal joint, namely, that terminating the rod 14d, the problem is to tie in the rods 14a, 14b and 14c with the stations 1y, 2y and 3y, respectively, so that the lengths of the 14-rods and the angles which they make with the horizontal and with the meridian will be the same as those which they would have made had it been possible to connect such a large number of rods in a universal joint at the point 4y. This is accomplished as follows:

On the proto-target 4y, Fig. 4, at any convenient angle with the meridian and at a convenient radius, locate the point 1y'. Let the coordinates of this point with respect to the target or point 4y be $r_1$ and $k_1$ where $r$ is the radius and $k$ is the angle between the meridian and the point 1y'. On the map 6 of Fig. 3, with the point 1y as a pole, locate the point 1y'' at a radius equal to $r_1$ and an angle with the meridian equal to $k_1$. Then the line 14a joining the points 1y' and 1y'' is equal in length to the line joining the points 4y and 1y, and the angles which the former-described line makes with the horizontal and with the meridian are equal, respectively, to the angles which the latter-described line makes with the horizontal and the meridian.

In similar fashion a construction may be made of a point $3y'$ and a point $3y''$ at radii $r_3$ and angles $k_3$, and similarly a construction may be made of points $2y'$ and $2y''$.

It will be observed that the various radii $r_1$, $r_2$, $r_3$, etc., need not be equal, nor need the angles $k_1$, $k_2$ and $k_3$ be equal, but that radius $r_1$ on the proto-target must be equal to radius $r_1$ on the map, and similarly angle $k_1$ must be equal to the corresponding angle on the map.

Since the distance from each of the actual $y$ points on Fig. 4 to each of the $y'$ points is the same, both on the plate 23 and the plate 6, then such distances with the actual rods 14 and the theoretical line of such rods will at all times be a parallelogram. This shifting of the rods 14 makes possible the connection of the same at their upper ends to the proto-target plate 23 by means of spaced ball and socket joints as illustrated in Fig. 5. This connection may be conveniently accomplished by utilizing two plates 23a and 23b between which are held balls 14x formed on the upper ends of each of the rods 14.

As previously indicated, the means whereby each of the rods 14a to 14d are supported at their lower ends are each provided with a pair of beat frequency oscillators, the respective output frequencies of which are variable, proportionally in accordance with variations in the altitude and azimuth of the particular rod associated therewith.

In my copending application, Serial No. 408,658, filed Aug. 28, 1941, I have disclosed the details of construction of a control device whereby the position of the handle or stick of a remote device may be caused to follow and coincide with the relative position of a similar handle or stick at a control station. This is accomplished in my said copending application by having the handle at the control station connected with and capable of adjusting the output frequency of a beat frequency oscillator.

The remote station is then provided with means functionally responsive to variations in the output frequency of the beat frequency oscillator at the control station whereby the corresponding handle or stick at the control station will at all times coincide in its relative position with the handle or stick at the control station, within known limits. In my said copending application, I have indicated that the output frequency of the beat frequency oscillator at the control station is transmitted by wireless to the controlled station, and such expedient may be used in the present application of such system.

It will be observed, however, that the control station and the remote station in the present application of the system of my previous application may be connected by wires if desired, thus making it unnecessary to employ either the standard radio transmitter or antenna at either the control or remote station.

In other words, the beat frequency oscillator 18 of Fig. 6 of the drawings herein corresponds to the beat frequency oscillator 2 of Fig. 1 of the drawings of my aforesaid copending application.

Each of the actual devices located at stations 1, 2, 3 and 5 in Fig. 1 hereof will be provided with a pair of control systems like that shown in Fig. 1 of my said copending application, each such system being tuned to and functionally responsive to the beat frequency oscillator 18 and 22 respectively located at the corresponding station on Fig. 3. It will thus be observed that the operator of the device may manipulate the proto-target plate 23 by moving it about in space while the same is preferably maintained parallel at all times with the base plate 6, by known parallel motion connecting means, as need not be shown (for instance, suitable parallel linkage on the order of that on universal drafting machines, only having three of the units connected end to end between the base and the proto-target and being respectively hinged such that each swings in one of the three-dimensional planes), and as such manipulation results in a variation in the elevation and azimuth of the rods 14, the actual devices at stations 1, 2, 3 and 5 in Fig. 1 will be adjusted so that the polyhedron defined by the linear trajectory of such devices is at all times similar to the proto-polyhedron formed by the operator at the station of Fig. 3 by movement of the proto-target plate 23.

Now let us assume that the devices at stations 1, 2 and 3 of Fig. 2 are directional microphones, and that the device at station 5 is an anti-aircraft cannon. The operator at the control station and who manipulates the proto-target 4y will be provided with means, schematically illustrated by the earphones 40, whereby he may listen to the intensity of the sound picked up by the directional microphones. He will move the proto-target plate 23 about until the point of maximum intensity is reached. This will indicate that the apex of the actual polyhedron of Fig. 1 coincides with or lies on the point from which the sound energy was emitted. The cannon 5 will similarly move in coordination with the arm 14d on Fig. 3 so that it remains sighted at all times on the apex of this polyhedron. When the operator determines that the apex of the polyhedron of Fig. 1 lies on the point from which the sound energy was emitted, he merely need press a button, such as 24, on the handle 25 by which the proto-target 4y is manipulated, and if this button is electrically connected with the gun-firing mechanism, the cannon at station 5 will be discharged instantaneously that the operator realizes that the apex of the actual polyhedron 1, and accordingly the line of trajectory of the gun 5, is directly on the point from which the sound energy was emitted.

It may be somewhat difficult at first for the operator to hunt out and locate the point from which the sound energy was emitted so that he may place the apex of the polyhedron of Fig. 1 thereon, and if the target is in motion, have such apex follow the movement of the target. The manner in which the operator may move the proto-target in thus hunting out the actual point from which the sound energy was emitted, I have attempted to diagrammatically illustrate in Fig. 8.

By referring to Fig. 8, let us assume that the point Z is the point at which the operator is holding the proto-target 4y, whereas the point A is the point at which the proto-target should be positioned in order to have the apex of the tetrahedron of Fig. 1 coincide with the actual target 4. If the operator will describe a circle indicated by the reference character 26, he will determine that the maximum intensity of the sound from the directional microphones will be heard when the proto-target is at position 27, that is, closest to the theoretically desired position A. He will then use this new point 27 as the center of a new circle 28, through which the proto-target is rotated, and in doing so he will discover that maximum intensity occurs at the point 29, in which case he will rotate the proto-target through the circle 30, and so on determining a new set of points by which the point A may be approached.

After finding two new points, such as 27 and 29 in the manner indicated, the operator will have indicated to him the line along which the proto-target should be moved in approaching the point at which he wishes to arrive, and thereafter he need only follow this line with the proto-target instead of continuing the construction of circles in the manner described.

The foregoing description of one embodiment of my invention is believed sufficiently illustrative of its principles to permit those skilled in the art to adapt the same to a wide variety of conditions and uses. While the several points or stations of the devices to be coordinated have been illustrated in the description as all lying in the same plane, i. e., the base of the proto-polyhedron is a flat plane, this is not a necessary requirement to the operation of my invention. The only requirement necessary is that the proto-polyhedron be constructed geometrically similar to the actual polyhedron produced by the linear trajectories of the devices sought to be coordinated.

Various combinations of projection and detection devices in addition to those enumerated above, will be apparent to those familiar with the art. For example, the detection devices may be directional microphones and the projection device may be a search light. Such an arrangement will be found valuable in picking up, by means of a search light, aircraft flying in the night. The directional microphones will fix the location of the apex of both the actual polyhedron and the proto-polyhedron, and as soon as such apex coincides with the target, as determined by the loudest sound received by the microphone, the search light, being constantly fixed on such apex, will simultaneously strike the target, illuminating the same.

As previously indicated, the detector devices may be microphones or search lights, or a combination of both, and the projection device may be a cannon. When this combination is utilized, the cannon will be fired at the moment the operator determines in the manner previously indicated that the apex of the actual polyhedron made by the linear trajectory and the projection devices coincides with the target.

My invention will also be found of particular utility when a plurality of projection devices are employed. Thus a plurality of anti-aircraft cannon may be controlled so that their trajectory passes through the apex of the polyhedron formed by the linear trajectory of the detection devices. In this way, a field of fire may be established from a plurality of sources, and a very effective destructive area generated in the vicinity of the target.

It is also within the contemplation of my invention to utilize two projection devices, one of which is a search light, and the other of which is a cannon. The operator in this way can check himself in determining when the apex of the actual polyhedron determined by the detecting microphones is on the target, since the beam of the search light comprising one of the projecting devices passes through such apex, and will illuminate the target when such apex falls on the target. The cannon comprising the other projection device will be set so that its trajectory passes through the apex, and when the operator finds that the search light comprising one of the projection devices falls on the target, the fire from the cannon will pass through the target.

In the foregoing description, reference has been made to the correlation of the trajectory of a projected device, such as a cannon, in order that the same may pass through the apex of the polyhedron formed by the linear trajectory of the detecting devices. It will be understood by those familiar with the art that the usual corrections must be incorporated in the gun-sighting mechanism in order that its range and the like may be so correlated that the trajectory does pass through the apex of the polyhedron. Such variation in the trajectory of the cannon, and the means for accomplishing the same, form no part of the present invention which are covered by a separate application in course of preparation.

Similarly, due allowance must be made for the conditions which exist where the detecting devices are microphones, and the sound-emitting target is movable. In other words, allowance must be made for the time lag, due to the length of time required for the sound to travel from the target to the detecting devices, and the consequent change in position of the target by the time such sounds are actually received. This is also the subject matter of an application in course of preparation.

Other modes of applying the principle of the invention may be employed, change being made as regards the details described, provided the features stated in any of the following claims or the equivalent of such be employed.

I, therefore, particularly point out and distinctly claim as my invention:

1. In apparatus of the character described the combination of a gun and a plurality of detection devices arranged at spaced points and capable of being directionally focused upon a target, a small scale model proto-terrain upon which are positioned, to scale, the location of the gun and said detection devices providing detector stations, a proto-target, a plurality of axially movable members connected at their opposite ends to the detector stations and gun location on said proto-terrain and to said proto-target, said members respectively being homologous to the beams of said detection devices and linear trajectory of said gun, and means for continuously coordinating the azimuth and elevation of said gun and detection devices with the azimuth and elevation of said members on said proto-terrain whereby the beams of said detection devices and trajectory of said gun at all times substantially coincide at a common point above the actual terrain corresponding to the location of said proto-target with respect to said proto-terrain.

2. In a gun control mechanism, a gun, a plurality of directional detectors arranged at spaced points and capable of being directionally focused on a target, a small scale model proto-terrain upon which are positioned to scale the location of the gun and said detectors and including a proto-target in relation, said proto-target comprising a gun control member, remote control transmitters mounted on said proto-structure at points homologous to the positions occupied by the direction detectors and the gun for controlling said detectors and gun, direction indices on said transmitters homologous to the direction of said gun control member and said directions of critical discrimination, and means for the simultaneous operation of said remote control transmitters so that the direction index of the remote control transmitter corresponding to the gun control member always includes the intersection of the direction indices of the remote control transmitters corresponding to the directional detectors, said means comprising a polybar linkage including members the effective length of which is variable and which members include the centers of rotation of the direction indices of the remote control transmitters as the joints in the linkage.

3. In apparatus of the character described, a small scale model proto-target and a proto-polyhedron base having points corresponding to gun and observation point locations, axially movable members connecting the proto-target and the points on the base of the proto-polyhedron, said members corresponding to the beams or linear trajectories of the observation points and gun, synchronous transmission means connecting the proto-polyhedron base points and the actual guns and observation points to control the same to a common focus in space of the guns and observation points corresponding to the location of the small scale model proto-target, and transmission means for firing the gun.

JOHN J. MOYNIHAN.